(12) United States Patent
Gauthier, Jr. et al.

(10) Patent No.: US 7,518,845 B2
(45) Date of Patent: Apr. 14, 2009

(54) RC-TRIGGERED POWER CLAMP SUPPRESSING NEGATIVE MODE ELECTROSTATIC DISCHARGE STRESS

(75) Inventors: Robert J. Gauthier, Jr., Hinesburg, VT (US); Dimitrios K. Kontos, Milton, VT (US); Junjun Li, Williston, VT (US); Souvick Mitra, Burlington, VT (US); Christopher S. Putnam, Hinesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 11/422,608

(22) Filed: Jun. 7, 2006

(65) Prior Publication Data

US 2007/0285853 A1    Dec. 13, 2007

(51) Int. Cl.
*H02H 9/00*    (2006.01)
*H02H 1/00*    (2006.01)
(52) U.S. Cl. ....................................................... 361/56
(58) Field of Classification Search ..................... 361/56
See application file for complete search history.

(56) References Cited

U.S. PATENT DOCUMENTS

| | | | |
|---|---|---|---|
| 4,430,587 A | 2/1984 | Tennyson | 307/590 |
| 4,874,967 A | 10/1989 | Deane | 307/296.8 |
| 5,920,221 A | 7/1999 | Shen et al. | 327/264 |
| 5,936,451 A | 8/1999 | Phillips et al. | 327/285 |
| 6,008,970 A | 12/1999 | Maloney et al. | 361/56 |
| 6,157,530 A | 12/2000 | Pequignot et al. | 361/111 |
| 6,300,813 B1 | 10/2001 | Matsui | 327/288 |
| 6,442,008 B1 | 8/2002 | Anderson | 361/56 |
| 6,455,902 B1 | 9/2002 | Voldman | 257/378 |
| 6,552,886 B1 * | 4/2003 | Wu et al. | 361/56 |
| 6,690,561 B2 * | 2/2004 | Hung et al. | 361/111 |
| 6,920,026 B2 | 7/2005 | Chen et al. | 361/56 |
| 2003/0107424 A1 | 6/2003 | Huang | 327/310 |

FOREIGN PATENT DOCUMENTS

JP    6327262    11/1994

* cited by examiner

*Primary Examiner*—Ronald W Leja
(74) *Attorney, Agent, or Firm*—Downs Rachlin Martin PLLC

(57) ABSTRACT

An electrostatic discharge (ESD) power clamp circuit including a RC-delay element coupled to a plurality of serialized inverter elements with a power clamp element and an ESD-triggered keeper device coupled to the plurality of inverters. During negative mode ESD events, the ESD-triggered keeper device is activated and assists the power clamp element to pull up and strongly conduct current to protect the circuit. Additionally, a method of ESD protection in a circuit is provided. The method includes coupling a RC-delay element to an input of a plurality of serialized inverter elements, coupling an output of the plurality of serialized inverters with an ESD-triggered keeper device and a power clamp element, triggering the ESD-triggered keeper device to turn on during negative ESD events and conducting current by the power clamp element with assistance of the ESD-triggered keeper device to protect the circuit as a result of negative ESD events.

20 Claims, 5 Drawing Sheets

RC-TRIGGERED POWER CLAMP SUPPRESSING NEGATIVE MODE ELECTROSTATIC DISCHARGE STRESS

FIELD OF THE INVENTION

The present invention generally relates to electrostatic discharge (ESD) protection circuits. In particular, the present invention is directed to a RC-triggered power clamp capable of suppressing negative mode ESD stress.

BACKGROUND OF THE INVENTION

Electrostatic discharge (ESD) is a momentary and sudden electric current that flows when an excess of electric charge, stored on an electrically insulated structure, finds a path to a structure at a different electrical potential, such as ground. ESD is particularly a serious concern with microelectronic devices. The integrated circuits (IC) in these devices are made from semiconductor materials, such as silicon, and insulating materials, such as silicon dioxide, which can break down when exposed to high voltages.

ESD stress occurs in two modes: positive mode ESD and negative mode ESD. Positive mode ESD occurs when there is positive ESD stress at voltage supply (VDD) and ground line is at GND (ground) or when ground line is at VDD and there is negative ESD stress at GND. Negative mode ESD occurs when there is negative ESD stress at VDD and ground line is at GND or when ground line is at VDD and there is positive ESD stress at ground line.

Conventional ESD protection may be integrated onto chips using two types of snapback MOSFET-based strategies: gate-grounded NMOSFET (GGNMOS) and gate-tied to VDD PMOSFET (GVPMOS). These snapback strategies trigger the snapback mechanism to conduct the large amount of ESD current for ESD protection. Both snapback strategies use a RC-triggered power clamp to protect the whole chip from ESD events. These snapback strategies are effective for positive mode ESD stress where the conventional RC-triggered power clamps are fully on during positive mode ESD stress. However, these RC-triggered power clamps typically turn on only weakly and perform poorly during negative mode ESD stress events. Designing to suppress negative mode ESD stress is a major design concern for silicon on insulator (SOI) technology, with floating-body devices.

Another strategy for negative mode ESD protection is to add a parasitic diode into the circuit. However, such parasitic diodes occupy valuable silicon area on a chip and are not optimized for ESD stress. Moreover, parasitic diodes are often not found in floating-body devices.

SUMMARY OF THE DISCLOSURE

In one aspect, an electrostatic discharge (ESD) power clamp circuit is disclosed. The circuit comprises a RC-delay element coupled to a plurality of serialized inverter elements, a power clamp element and an ESD-triggered keeper device coupled to the plurality of inverters. At least one of the power clamp element and the ESD-triggered keeper device is activated as a result of an ESD event.

The disclosure also provides an ESD power clamp circuit. The circuit comprises a RC-delay element coupled to a plurality of serialized inverter elements having an output, an ESD-triggered keeper device and a power clamp element coupled to the output of the plurality of inverters. The ESD-triggered keeper device is designed to turn on during a negative mode ESD event with the result that the ESD-triggered keeper device assists the power clamp element to pull up and strongly conduct current to protect the circuit.

The disclosure also covers a method of ESD protection in a circuit. The method comprises coupling a RC-delay element to an input of a plurality of serialized inverter elements, coupling an output of the plurality of serialized inverters with an ESD-triggered keeper device, triggering the ESD-triggered keeper device to turn on during a negative ESD event, and conducting current by the power clamp element with assistance of the ESD-triggered keeper device to protect the circuit as a result of the negative ESD event.

BRIEF DESCRIPTION OF THE DRAWINGS

For the purpose of illustrating the invention, the drawings show aspects of one or more embodiments. However, it should be understood that the present disclosure is not limited to the precise arrangements and instrumentalities shown in the drawings, wherein.

DETAILED DESCRIPTION

Figure 1:
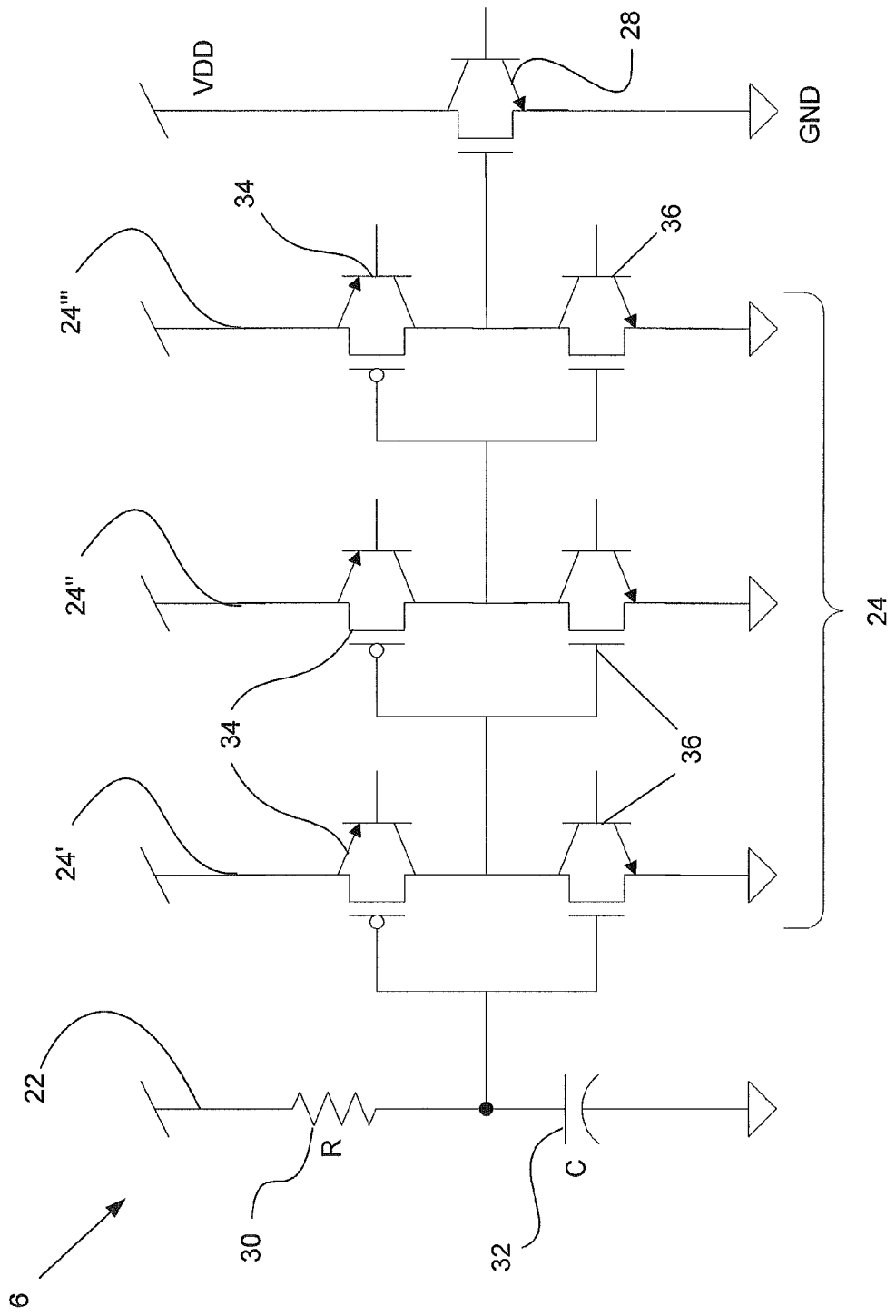
FIG. 1 illustrates a conventional power clamp circuit.

Referring now to the figures, FIG. 1 illustrates a conventional power clamp circuit 6. Power clamp circuit 6 includes an RC-delay or triggering element 22 having a resistor 30 connected in series with a capacitor 32. RC-delay element 22 is connected in series with a plurality of serialized inverters 24 connected in series with a power clamp element 28. Power for circuit 6 is typically supplied by a voltage supply referred to as VDD with ground represented by GND. During all ESD events, inverters 24 trigger on power clamp element 28 to conduct current. Power clamp circuit 6 is generally designed for positive mode ESD events. However, power clamp circuit 6 conducts poorly during negative mode ESD events.

Figure 2:
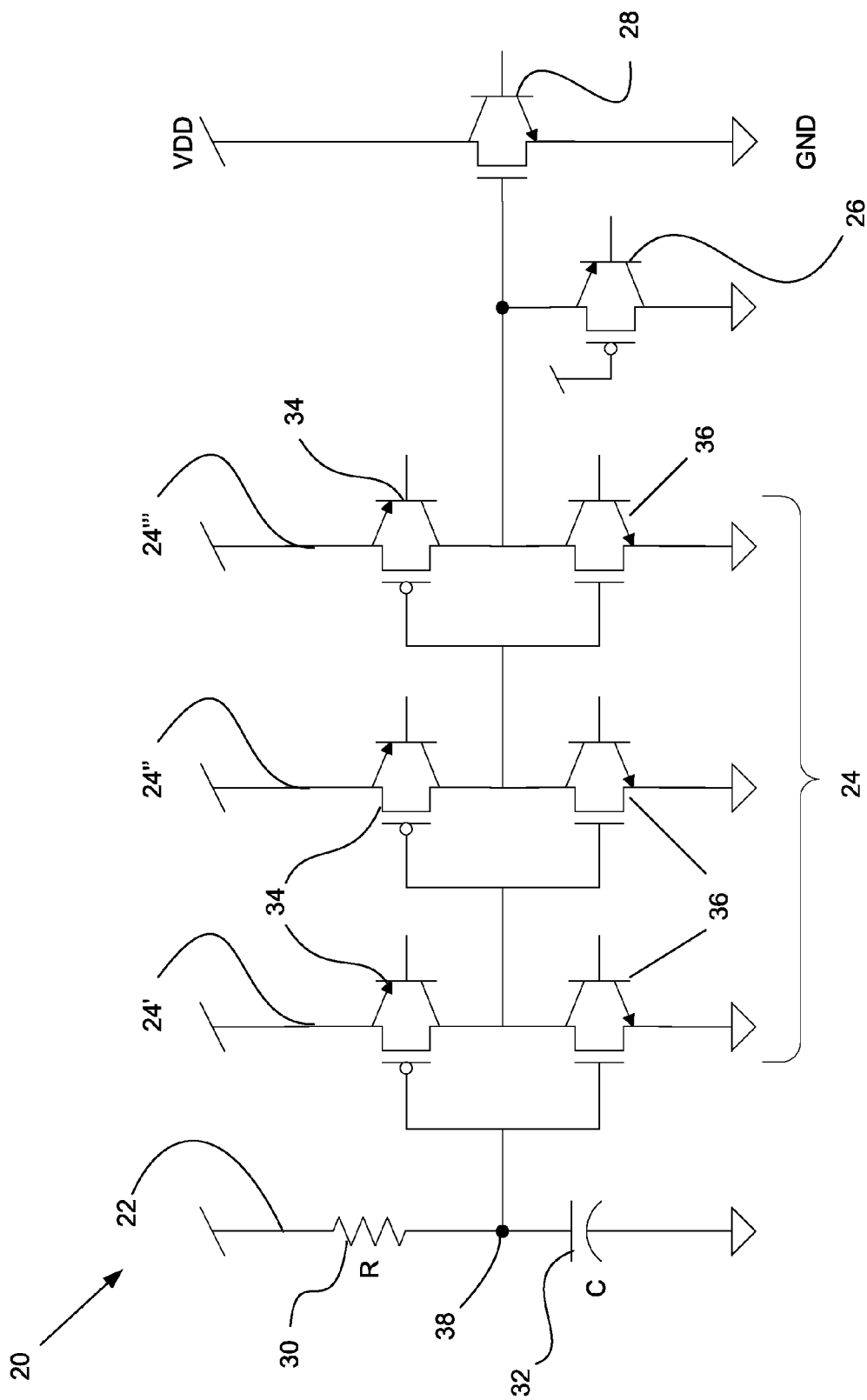
FIG. 2 illustrates a RC-triggered power clamp circuit in accordance with one embodiment of the present disclosure.

FIG. 2 illustrates one embodiment of the disclosure showing a floating-body NFET-based power clamp circuit 20 for detecting and controlling both negative and positive modes of electrostatic discharge (ESD) stress. Circuit 20 protects against all types of ESD stress events in accordance with a human-body model (HBM), machine model (MM), and charged-device model (CDM), as well known in the art.

Power clamp circuit 20 includes an RC-delay or triggering element 22 having a resistor 30 connected in series with a capacitor 32 at node 38. RC-delay element 22 is connected in series with a plurality of serialized inverters 24. It should be noted, that any commercial or conventional RC-delay circuit and inverter could be utilized without departing from the scope and spirit of the present disclosure. Inverters 24 are connected in series with an ESD-triggered keeper device 26 and a power clamp element 28. Power for circuit 20 is typically supplied by a voltage supply referred to as VDD, which has a voltage level dependent on the process used, with ground represented by GND.

In the embodiment illustrated in FIG. 2, plurality of serialized inverters 24 includes a first inverter 24' connected in series with a second inverter 24" connected in series with a third inverter 24'''. The number of inverters utilized in plurality of inverters 24 is variable according to the application requirements. It should be noted that less or more inverters may be utilized without departing from the scope and spirit of the disclosure. Plurality of inverters 24 may be implemented using CMOS inverters, as illustrated in FIG. 2. CMOS inverters 24'-24''' each include a floating-body PFET element 34 chained to a floating-body NFET element 36. The gate terminals of PFET 34 and NFET 36 of first inverter 24' are connected to RC-delay element 22 at node 38. The drain terminals of PFET 34 and NFET 36 of third inverter 24''' are connected to a source terminal of ESD-triggered keeper device 26 and a gate terminal of power clamp element 28. ESD-triggered keeper device 26, also referred to as an ESD-triggered pull up device, may include a floating-body PFET element. Power clamp element 28, also referred to as the main conducting device or big FET, may include a large floating-body NFET element.

During normal operation and positive mode ESD events, ESD-triggered pull up device 26 is turned off and has no effect on circuit 20. Positive mode ESD events generally occur where a fast rise voltage/current pulse is applied onto VDD causing the voltage across capacitor 32 to remain at zero. The voltage at node 38 is at a relatively low voltage level, "LOW." "HIGH" and "LOW" voltage levels are relative to the voltage level to switch inverter 24. "HIGH" would be in the range of VDD to VDD minus VT, and LOW would be in the range of 0 to VT, where VT is the threshold voltage of the MOSFET. The gate terminal of power clamp element 28 is at voltage level "HIGH." Inverters 24 trigger on power clamp element 28 to conduct current. After the delay provided by RC-delay element 22 ends, which generally lasts as long as the ESD event, capacitor 32 is charged to higher than a threshold voltage of inverters 24, which are at voltage level "HIGH." Inverters 24 then switch and trigger the gate terminal of power clamp element 28 to voltage level "LOW." Power clamp element 28 then turns off.

When a fast rise voltage/current pulse is applied onto GND, a negative mode ESD event occurs in floating-body power clamp circuit 20. The voltage across capacitor 32 remains at zero. The voltage at node 38 is at voltage level "HIGH." The output of inverter 24' is at voltage level "HIGH-VT," where VT is a threshold voltage of the NFET of the inverter. The outputs of inverters 24" and 24''' are at voltage levels "HIGH-2VT" and "HIGH-3VT," respectively. Because the output of inverter 24''' is connected to the gate terminal of power clamp element 28, as discussed above, power clamp element 28 turns on weakly and conducts current poorly during negative mode ESD events if a keep device 26 is absent. However, since the gate terminal of power clamp element 28 is also connected to the source terminal of keeper device 26, and the keeper device (PMOSFET) is turned on given its gate at "LOW" and its drain at "HIGH", it acts as a pull-up device to pull the gate terminal of 28 to "HIGH", and strongly turns on power clamp element 28. After the delay provided by RC-delay element 22 ends, capacitor 32 is charged so that the voltage at node 38 is at voltage level "LOW." Inverters 24 then switch and trigger the gate terminal of power clamp element 28 to voltage level "LOW." The negative mode ESD event triggers keeper device 26 to turn on. Keeper device 26 assists power clamp element 28 to pull up and strongly conduct current.

ESD-triggered keeper device 26 boosts the performance of circuit 20 by clamping the circuit to lowest voltage during negative mode ESD stress events. Conventional circuits generally require the addition of a parasitic diode for protection during negative mode ESD events. Keeper device 26 relaxes the requirement for adding a parasitic diode or additional ESD diode for negative mode ESD stress protection. Such diodes occupy valuable space on a chip. Moreover, a parasitic diode is often not optimized for negative mode ESD stress and floating-body devices generally do not utilize parasitic diodes.

Figure 3:
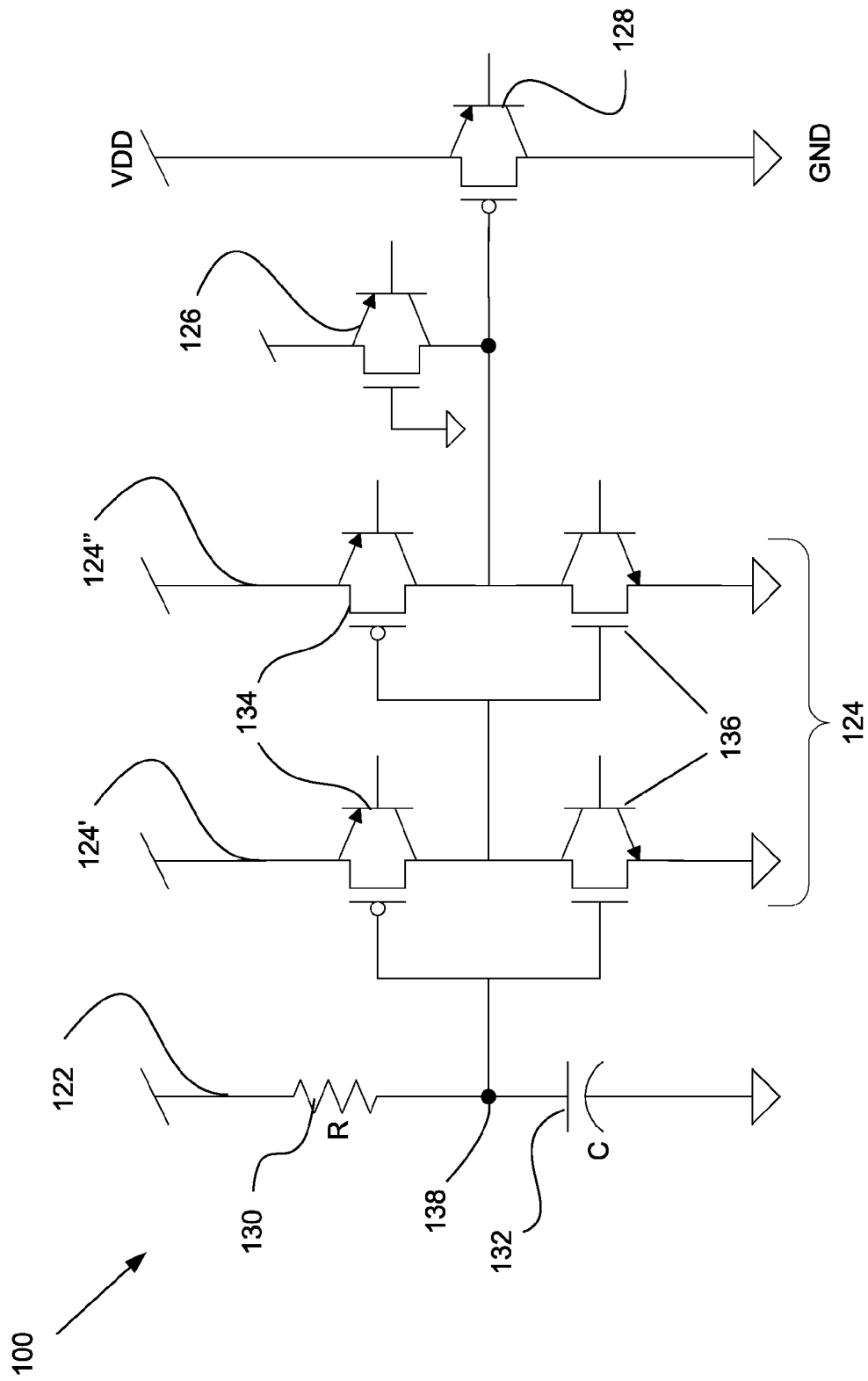
FIG. 3 illustrates a RC-triggered power clamp circuit in accordance with another embodiment of the present disclosure.

In another embodiment, a floating-body PFET-based power clamp circuit 100 is illustrated in FIG. 3. Circuit 100 includes an RC-delay or triggering element 122 having a resistor 130 connected in series to a capacitor 132 at a node 138. As previously stated, any conventional or commercial RC-delay circuit can be employed while keeping with the scope and spirit of the disclosure. In addition, circuit 100 includes a plurality of serialized inverters 124 connected in series with RC-delay element 122, an ESD-triggered keeper device 126 and a power clamp element 128. A power supply for circuit 100 is typically supplied by a voltage supply referred to as VDD.

In this embodiment, power clamp element 128 includes a floating-body PFET element for conducting current during normal operation and positive mode ESD events. ESD-triggered keeper device 126 includes a floating-body NFET element for helping power clamp element 128 strongly conduct current during negative mode ESD stress events. Each inverter 124' and 124" includes a floating-body PFET element 134 chained to a floating-body NFET element 136.

During a negative mode ESD stress event, circuit 100 performs in a similar manner to the example described above for floating-body NFET-based circuit 20, as well known to one of ordinary skill in the art. However, keeper device 126 is configured with a floating-body NFET element with the gate terminal at GND and the drain terminal at VDD to complement the floating-body PFET element of power clamp element 128, such that keeper device 126 pulls up during negative mode ESD stress to assist power clamp element 128.

Figure 4:
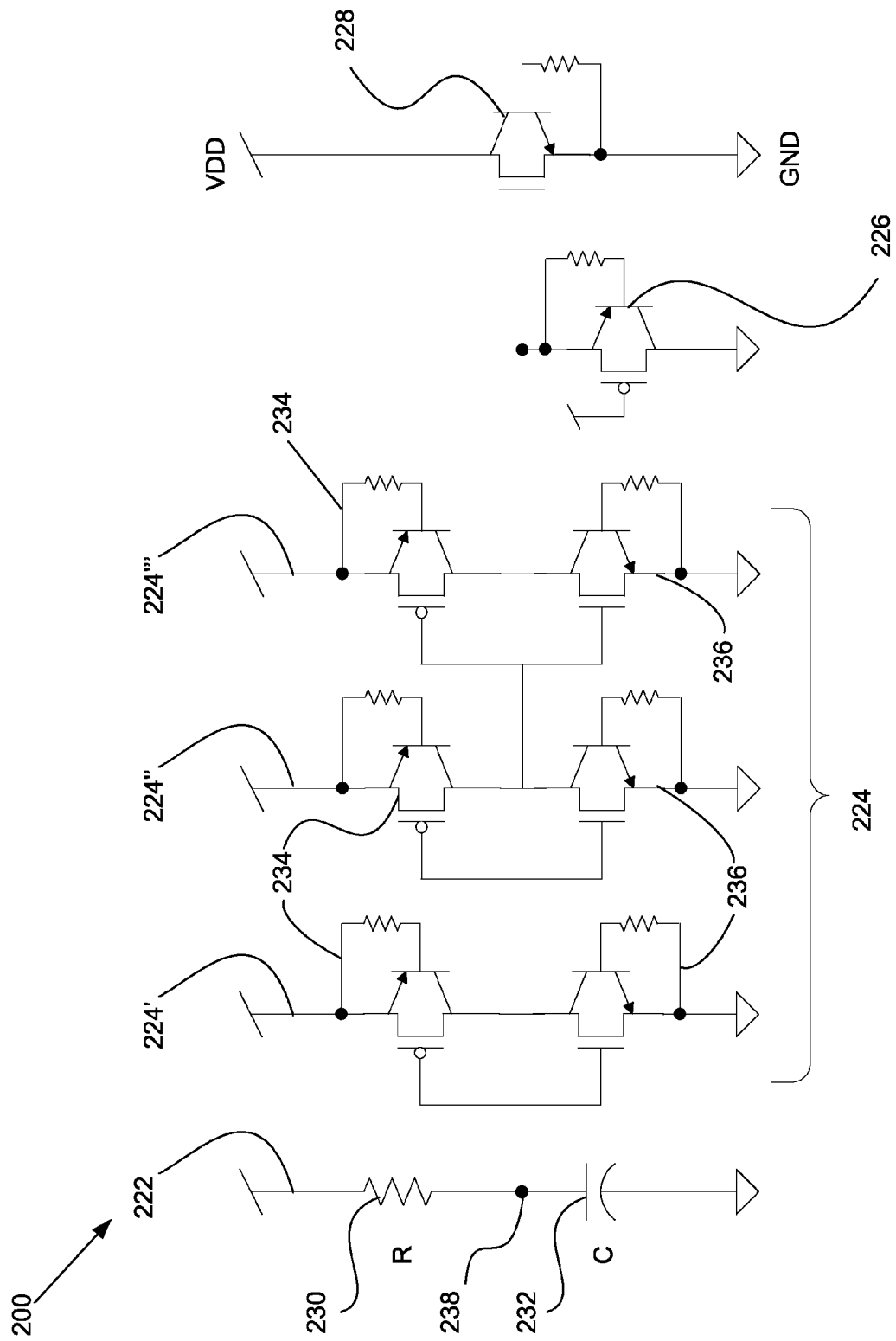
FIG. 4 illustrates a RC-triggered power clamp circuit in accordance with yet another embodiment of the present disclosure.

In yet another embodiment, a tied-body NFET-based power clamp circuit 200 is illustrated in FIG. 4. Circuit 200 includes an RC-delay or triggering element 222 having a resistor 230 connected in series to a capacitor 232 at a node 238. RC-delay element 222 is connected in series to a plurality of serialized inverters 224, which is connected in series an ESD-triggered keeper device 226 and a power clamp element 228. A power supply for circuit 200 is typically supplied by a voltage supply referred to as VDD.

In the embodiment illustrated in FIG. 4, power clamp element 228 includes a tied-body NFET-based element with the body tied to the source terminal for conducting current during normal operation and positive mode ESD events in a similar manner to the example described above for power clamp circuit 20 as well known in the art. Keeper device 226 assists power clamp element 228 to pull up and strongly conduct current during negative mode ESD stress events. Each inverter 224', 224" and 224''' includes a tied-body PFET element 234 chained to a tied-body NFET element 236.

When a fast rise voltage/current pulse is applied onto GND, a negative mode ESD event occurs in tied-body NFET-based power clamp circuit 200. The voltage across capacitor 232 of RC-delay element 222 remains at zero. The voltage at node 238, between resistor 230 and capacitor 232, is at voltage level "HIGH." The output of first inverter 224' is at voltage level "HIGH-VT," where VT is the threshold voltage of NFET of the inverter. The output of second inverter 224" is at voltage level "HIGH-2VT." The output of third inverter 224''' is voltage level "HIGH-3VT." The output of third inverter 224''' is connected to the source terminal of keeper device 226 and the gate terminal of power clamp element 228. Keeper device 226 turns on and assists power clamp element 228 to pull up and strongly conduct current during the negative mode ESD event.

Figure 5:
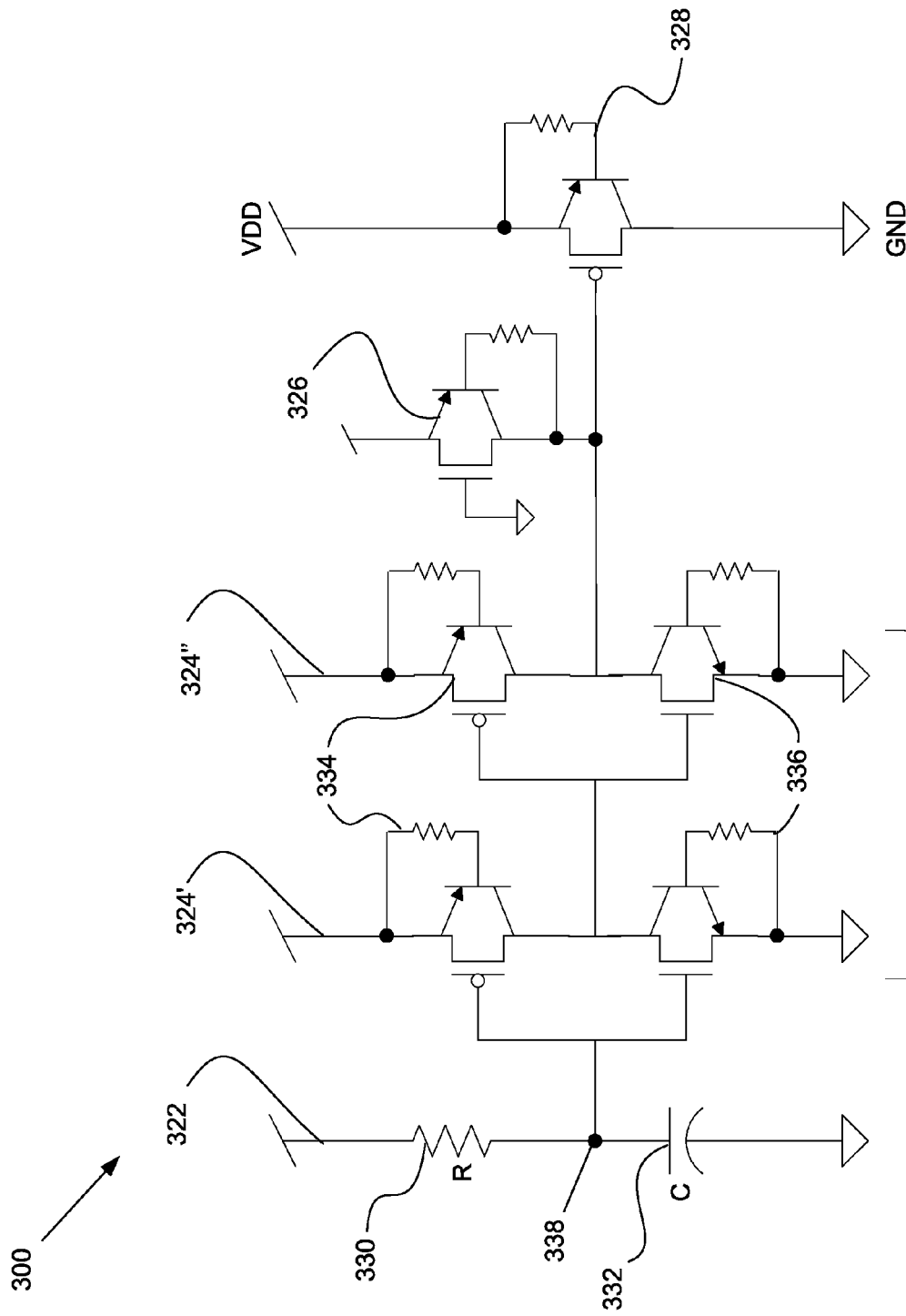
FIG. 5 illustrates a RC-triggered power clamp circuit in accordance with still another embodiment of the present disclosure.

In still another embodiment, a tied-body PFET-based power clamp circuit 300 is illustrated in FIG. 5. Circuit 300 includes an RC-delay or triggering element 322 having a resistor 330 connected in series to a capacitor 332 at a node 338. RC-delay element is connected in series with a plurality of serialized inverters 324, which are connected in series with an ESD-triggered keeper device 326 and a power clamp element 328. A power supply for circuit 300 is typically supplied by a voltage supply referred to as VDD.

In this embodiment, power clamp element 328 includes a tied-body PFET-based element with the body tied to the source terminal for conducting current during normal operation and positive mode ESD events. ESD-triggered keeper device 326 includes a tied-body NFET-based element with the body tied to the drain terminal for conducting current during negative ESD stress events. Each inverter 324 includes a tied-body PFET element 334 chained to a tied-body NFET element 336.

During positive and negative mode ESD stress events, circuit 300 performs in a similar manner to the example described above for tied-body NFET-based power clamp circuit 200, as is well known to one of ordinary skill in the art. Keeper device 326 is configured with a tied-body NFET element with the gate terminal at GND to complement the tied-body PFET-based element of power clamp element 328 such that the keeper device pulls up for negative mode ESD stress events to assist the power clamp element.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electrostatic discharge (ESD) power clamp circuit comprising:
    a RC-delay element;
    a plurality of serialized inverter elements coupled to said RC-delay element;
    a power clamp element coupled to said plurality of inverters; and
    a negative ESD-triggered keeper device coupled to said plurality of inverters;
    wherein at least one of said power clamp element and said negative ESD-triggered keeper device is activated as a result of a negative mode ESD event.

2. An ESD power clamp circuit of claim 1, wherein said power clamp element activates and conducts current when said ESD event comprises a positive mode ESD event.

3. An ESD power clamp circuit of claim 1, wherein said negative ESD-triggered keeper device activates and assists said power clamp element to pull up and conduct current when said ESD event comprises a negative mode ESD event.

4. An ESD power clamp circuit of claim 1, wherein at least one of said plurality of inverter elements includes a CMOS inverter.

5. An ESD power clamp circuit of claim 1, wherein at least one of said plurality of inverter elements includes one or more floating-body FET devices.

6. An ESD power clamp circuit of claim 1, wherein at least one of said plurality of inverter elements includes one or more tied-body FET devices.

7. An ESD power clamp circuit of claim 1, wherein at least one of said ESD-triggered keeper device and said power clamp element includes a floating-body FET device.

8. An ESD power clamp circuit of claim 1, wherein said at least one of said ESD-triggered keeper device and said power clamp element includes a tied-body FET device.

9. An ESD power clamp circuit of claim 1, wherein the circuit is devoid of a parasitic diode.

10. An electrostatic discharge (ESD) power clamp circuit comprising:
    a RC-delay element;
    a plurality of serialized inverter elements coupled to said RC-delay element, said plurality of inverters having an output;
    a negative ESD-triggered keeper device coupled to said output of said plurality of inverters; and
    a power clamp element coupled to said keeper device and said output of said plurality of inverters;
    wherein said negative ESD-triggered keeper device is designed to turn on during a negative mode ESD event with the result that said negative ESD-triggered keeper device assists said power clamp element to pull up and conduct current to protect the circuit.

11. An ESD power clamp circuit of claim 10, wherein at least one of said plurality of inverter elements includes one or more floating-body FET devices.

12. An ESD power clamp circuit of claim 10 wherein at least one of said plurality of inverter elements includes one or more tied-body FET devices.

13. An ESD power clamp circuit of claim 10 wherein said ESD-triggered keeper device comprises a floating-body FET device.

14. An ESD power clamp circuit of claim 10 wherein said ESD-triggered keeper device comprises a tied-body FET device.

15. An ESD power clamp circuit of claim 10 wherein said power clamp comprises a large floating-body FET.

16. An ESD power clamp circuit of claim 10 wherein said power clamp comprises a large tied-body FET.

17. An ESD power clamp circuit of claim 10 devoid of a parasitic diode.

18. A method of electrostatic discharge (ESD) protection in a circuit, comprising:
    coupling a RC-delay element to an input of a plurality of serialized inverter elements;
    coupling an output of the plurality of serialized inverters with a negative ESD-triggered keeper device and a power clamp element; and
    conducting current by the power clamp element as a result of an ESD event.

19. A method of claim 18 further comprising:
    triggering the ESD-triggered keeper device to turn on during a negative ESD event; and
    conducting current by the power clamp element with assistance of the ESD-triggered keeper device to protect the circuit as a result of the negative ESD event.

20. A method of claim 18 wherein the circuit is devoid of a parasitic diode.

* * * * *